United States Patent Office 3,310,066
Patented Mar. 21, 1967

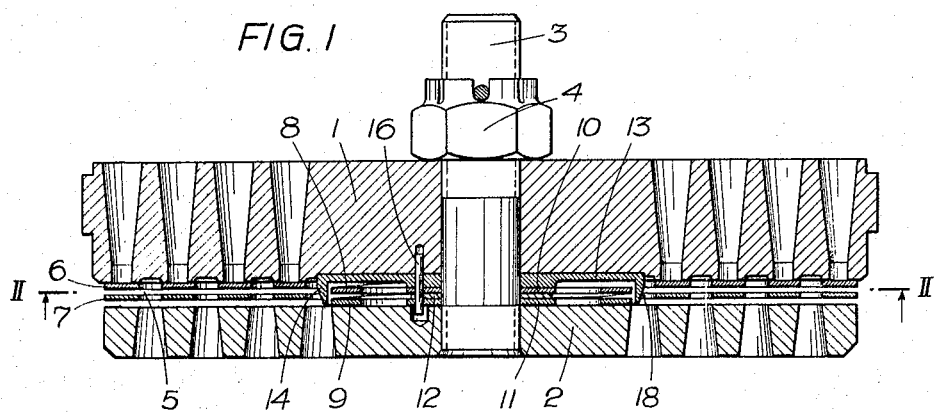
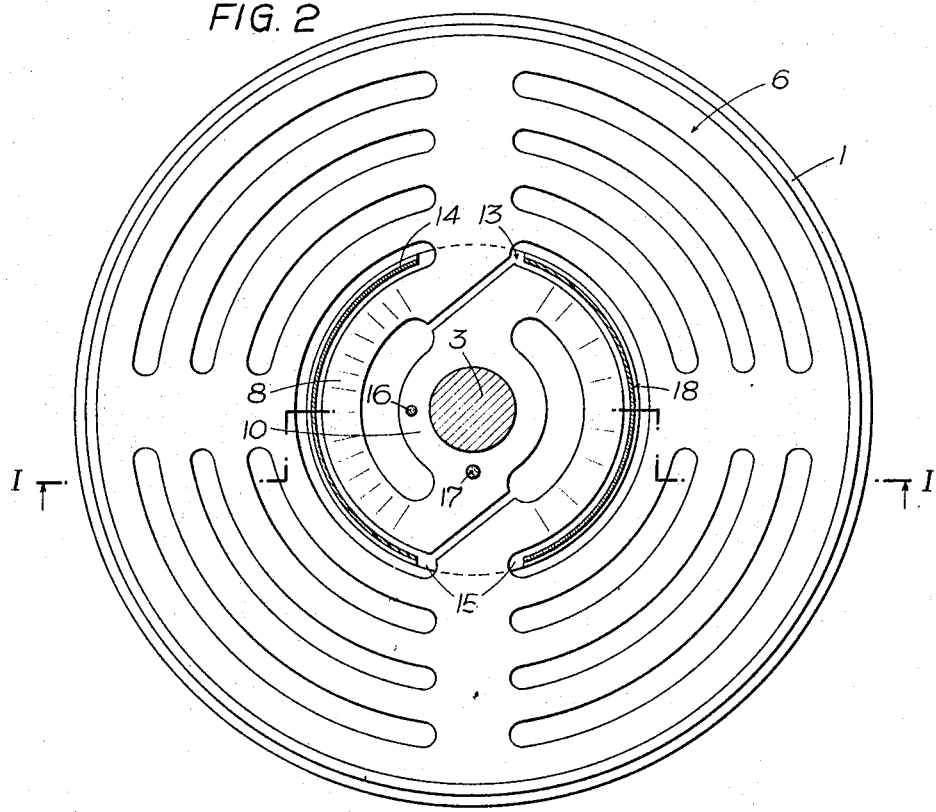

3,310,066
PLATE VALVE
Theodor Karl Kehler, Vienna, Austria, assignor to Hoerbiger Ventilwerke Aktiengesellschaft, Vienna, Austria
Filed Nov. 29, 1963, Ser. No. 326,773
Claims priority, application Austria, Dec. 12, 1962,
A 9,691/62
7 Claims. (Cl. 137—516.13)

The invention relates to plate valves comprising a valve seat, a valve guard arranged in spaced relation to the valve seat as to provide a gap, and plate-shaped closing members, such as for example, a valve plate and spring, guide or damping plates located in said gap, at least one of said plates being frictionless guided by means of flexible guide arms.

For certain requirements, plate valves are known to be designed as guided valves, thereby eliminating the friction produced by the sliding guidance of the slotted plates, which is particularly important for valves whose axis extends horizontally and in the event of "dry" operation when the mobile slotted plates are not lubricated. In addition, with large valves frictionless guidance is generally given preference over the sliding guidance of the slotted plates. Frictionless guidance can be obtained either by means of flexible guide arms attached to the slotted plates or by special guide plates having guide arms and connected with the slotted plates to be guided, as with the valve plate, for example. The guide arms are frequently ground out, i.e. deliberately tapered in thickness over a part of their free length, especially for valves featuring major stroke heights. However, particularly with valves for heavy media, for high flow speeds and high pressure, the guide arms are subject to comparatively major stresses as a result of which damage to the guide arms or even breakage may occur.

The present invention is based upon the perception that a substantial part of the stresses applied to the guide arms is caused by the impact of the medium passing through the valve and by such covibrations and turbulences as may be thereby produced and which in addition, involve an increase of the resistance to flow. Therefore it is the object of the present invention to protect the guide arms against the impact of the medium passing through the valve, thereby increasing the life of the valve and in addition reducing the resistance to flow.

In accordance with the invention the flow of the medium passing through the valve is deflected from the guide arms by the provision of deflecting means. Experience goes to show that by this method, damage to the guide arms and breakage are largely avoided even when heavy media, high pressures and major flow speeds are used, thus increasing the life of the valves considerably. Furthermore, resistance to flow of the valve diminishes as a result of the avoidance of turbulences in the space of the gap between the valve seat and the valve guard provided for the guide arms.

According to another embodiment of the invention, the deflecting means can be provided in the gap between the valve seat and the valve guard and partition the same while leaving recesses for the passage of the guide arms. The section of the said gap wherein the guide arms are located being essentially closed, the guide arms are shielded from the flow. According to a further feature of the invention, the deflecting means can be formed by projections or the like of the valve seat and/or of the valve guard protruding into the gap, thereby partitioning the gap in the area between the guide arms and their associated plates.

According to a preferred embodiment of the invention which is particularly suitable for ring valves, the valve plate and/or spring, guide or damping plates if provided, serving as closing members and having concentrically arranged annular passage slots, the deflecting means can be formed for example, by an annular flow body protruding with projections or the like through the passage slots of the plates adjoining the guide arms. Preferably, the flow body is clamped between the valve seat and the valve guard jointly with the hub portions of the plates. This embodiment of the invention is easy to manufacture without requiring substantial changes in the design of the valve components. If necessary, the flow body can also be subsequently incorporated in finished valves, such as for example, in lieu of the usual washer determining the distance between the valve seat and the valve guard.

Preferably the flow body is secured against rotation, for example, by at least one pin, in order to ensure maintenance of the correct position of the flow body in the valve and the free passage of the guide arms through the recesses between the projections. A special advantage can be obtained according to the invention by securing the flow body against rotation by means of two pins offset in relation to the valve axis by an angle different from 0 and 180 degrees respectively, the said pins being located at different distances from the valve axis and/or presenting different diameters. Thus, not only is the flow body secured against rotation, but the possibility of incorporating the flow body in the valve inversely, that is, with the projections or the like protruding in opposite direction involving the risk of damage to the plates, is thereby precluded.

Further details of the invention will appear from the following description of an embodiment of the invention with reference to the accompanying drawing in which:

FIG. 1 shows an axial cross-sectional view of a ring valve taken on line I—I in FIG. 2 in the direction of the arrows, and FIG. 2 shows a sectional view of same on line II—II of FIG. 1 taken in the direction of the arrows.

The suction valve illustrated in the drawing by way of example comprises a valve seat 1 and a valve guard 2 arranged in spaced relation thereto, both elements being connected with each other by means of a bolt 3 and nut 4. In the gap 5 between the valve seat 1 and the valve guard 2 a valve plate 6 is provided; moreover, an additional plate 7, which may be a spring or damping plate, for example, is illustrated as being located in the gap 5. Both plates 6 and 7 are equipped with guide arms 8 and 9, respectively, said guide arms being attached to hub portions 10 and 11 respectively. The hub portions 10 and 11 are clamped between the valve seat 1 and the valve guard 2 by means of the bolt 3 with the interposition of a washer 12 and a flow body 13.

On its outer surface, the annular flow body 13 presents annular projections 14 protruding through the passage slots of the plates 6 and 7 adjoining the guide arms 8 and 9 into the gap 5 and thus partitioning same in the area between the guide arms 8, 9 and their associated plates 6 and 7 respectively. As appears from FIG. 2, recesses 15 for the passage of the guide arms 8, 9 are provided between the projections 14. The pins 16 and 17, also shown as being fixed in the valve seat 1, serve to secure the plates 6 and 7 and at the same time, also the flow body 13 against rotation. The pins 16 and 17 are offset by 90 degrees in relation to the valve axis and present different diameters, so that neither the plates 6, 7 nor the flow body 13 can be inserted in the valve inversely. The projections 14 are chamfered on the outside and form deflecting surfaces 18 by means of which the flow of the medium passing through the valve is deflected from the guide arms 8, 9. Thus damage to the guide arms is avoided and at the same time, the resistance to flow of the valve is substantially reduced.

The invention is not restricted in scope to the multiple-ring valve illustrated in the drawing, but can also be advantageously applied to single-ring valves with guided closing members as well as to non-annular plate valves, lamellar valves etc. Furthermore, all the plates used in the valve according to the invention or part of them only can be guided without friction by means of guide arms, in which case special guide plates can be provided in lieu of the guide arms cast integral with the plates, said guide plates being connected with the valve plates in a suitable manner known in the art.

I claim:

1. A plate valve, comprising a valve seat, a valve guard arranged in spaced relation to the valve seat to provide a gap, and plate-shaped closing members comprising a valve plate and a spring plate located in said gap and provided with passage slots, at least one of said plates being freely guided by means of flexible guide arms located thereon, and deflecting means whereby the flow of the medium passing through the valve is deflected from the guide arms by the deflecting means formed by projections which protrude into the said gap in an axial direction of the valve so that the gap in the area between the guide arms and their associated plates is partitioned while leaving recesses for the passage of the guide arms.

2. A plate valve according to claim 1, in which the said projections protrude from the valve seat towards the valve guard into the said gap.

3. A plate valve according to claim 1, in which the closing members thereof are represented by at least one plate having concentrically arranged annular passage slots, whereby the deflecting means are formed by a flow body of annular shape and said flow body protrudes with projections through the passage slots of the plates adjoining the guide arms.

4. A plate valve according to claim 1, in which the closing members thereof are represented by at least one plate having concentrically arranged annular passage slots, whereby the deflecting means are formed by a flow body of annular shape and said flow body protrudes with projections through the passage slots of the plates adjoining the guide arms, and the flow body is clamped jointly between the valve seat and the valve guard.

5. A plate valve according to claim 1, in which the closing members thereof are represented by at least one plate having concentrically arranged annular passage slots, whereby the deflecting means are formed by a flow body of annular shape and said flow body protrudes with projections through the passage slots of the plates adjoining the guide arms, and the flow body is secured against rotation by at least one pin.

6. A plate valve according to claim 1, in which the closing members thereof are represented by at least one plate having concentrically arranged annular passage slots, whereby the deflecting means are formed by a flow body of annular shape and said flow body protrudes with projections through the passage slots of the plates adjoining the guide arms, and the flow body is secured against rotation by two pins offset in relation to the valve axis by an angle different from 0 and 180 degrees respectively, the said pins being located at different distances from the valve axis.

7. A plate valve according to claim 1, in which the closing members thereof are represented by at least one plate having concentrically arranged annular passage slots, whereby the deflecting means are formed by a flow body of annular shape and said flow body protrudes with projections through the passage slots of the plates adjoining the guide arms, and the flow body is secured against rotation by two pins offset in relation to the valve axis by an angle different from 0 to 180 degrees respectively, the said pins presenting different diameters.

References Cited by the Examiner

UNITED STATES PATENTS

| | | | |
|---|---|---|---|
| 306,386 | 10/1884 | Crosby | 137—536 X |
| 1,385,147 | 7/1921 | Prellwitz | 137—516 |
| 1,949,930 | 3/1934 | Davidson | 137—536 |
| 2,500,806 | 3/1950 | Dalrymple | 137—536 X |
| 3,083,941 | 4/1963 | Abos et al. | 137—516 X |

WILLIAM F. O'DEA, *Primary Examiner.*

D. ZOBKIW, *Assistant Examiner.*